(12) United States Patent
Manfredi et al.

(10) Patent No.: US 6,979,715 B2
(45) Date of Patent: Dec. 27, 2005

(54) THERMOPLASTIC HALOGENATED POLYMER COMPOSITIONS, METHOD FOR PREPARING SAME AND USE THEREOF

(75) Inventors: Dino Manfredi, Houthalen-Helchteren (BE); Fernand Gauthy, Wemmel (BE); Nestor Maquet, Waha (BE)

(73) Assignee: Solvay (Societe Anonyme), Brussels (BE)

( * ) Notice: Subject to any disclaimer, the term of this patent is extended or adjusted under 35 U.S.C. 154(b) by 22 days.

(21) Appl. No.: 10/466,560

(22) PCT Filed: Jan. 23, 2002

(86) PCT No.: PCT/EP02/00771

§ 371 (c)(1),
(2), (4) Date: Jan. 5, 2004

(87) PCT Pub. No.: WO02/059190

PCT Pub. Date: Aug. 1, 2002

(65) Prior Publication Data

US 2004/0106768 A1    Jun. 3, 2004

(30) Foreign Application Priority Data

Jan. 26, 2001 (FR) .................................. 01 01266

(51) Int. Cl.⁷ ............................. C08L 27/12; C08F 8/00

(52) U.S. Cl. ...................... 525/199; 525/342; 525/194; 525/200; 525/214

(58) Field of Search ................................. 525/194, 199, 525/200, 214, 342

(56) References Cited

U.S. PATENT DOCUMENTS

| 4,115,481 A |   | 9/1978 | Finlay et al. |
| 5,206,293 A | * | 4/1993 | Sakai et al. .................. 525/194 |
| 6,391,975 B1 | * | 5/2002 | Abusleme et al. .......... 525/199 |

FOREIGN PATENT DOCUMENTS

| EP | 0 422 960 | 4/1991 |
| EP | 0 811 641 | 12/1997 |
| EP | 1 067 148 | 1/2001 |
| JP | 02 258324 | 10/1990 |
| JP | 07 024897 | 1/1995 |

* cited by examiner

*Primary Examiner*—Ling-Sui Choi
(74) *Attorney, Agent, or Firm*—Oblon, Spivak, McClelland, Maier & Neustadt, P.C.

(57) ABSTRACT

Thermoplastic halogenated polymer compositions characterized by an $R_{MFI}$ value of between 1.1 and 6; process for preparing them; use for the manufacture of films, sheets, panels, foamed tubing, tubes, pipes, foams, bottles or products that are theromoformed and/or moulded; use of the foamed tubing for the sheathing of power cables.

20 Claims, 2 Drawing Sheets

THERMOPLASTIC HALOGENATED POLYMER COMPOSITIONS, METHOD FOR PREPARING SAME AND USE THEREOF

The invention relates to thermoplastic halogenated polymer compositions, to a process for preparing them, to their use for the manufacture of films, sheets, panels, foamed tubing, tubes, pipes, foams, bottles or products that are thermoformed and/or moulded, and to the use of the foamed tubing for the sheathing of power cables.

For many potential applications of thermoplastic halogenated polymers, particularly thermoplastic fluorinated polymers or fluoropolymers, it is necessary for these polymers to be characterized by extensional hardening behaviour in the melt. Among these applications, mention may be made of foamed tubing for the sheathing of power cables.

Unfortunately, most thermoplastic halogenated polymers, in particular thermoplastic fluoropolymers, do not naturally exhibit this extensional hardening behaviour in the melt.

One subject of the present invention is thermoplastic halogenated polymer compositions that do not have the aforementioned drawbacks.

Another subject of the present invention is a process for preparing these compositions.

Another subject of the invention is the use of these compositions for the manufacture of films, sheets, panels, foamed tubing, tubes, pipes, foams, bottles or products that are thermoformed and/or moulded.

Finally, another subject of the invention is the use of the foamed tubing obtained for the sheathing of power cables.

For this purpose, the invention relates first of all to compositions based on thermoplastic halogenated polymers, the said compositions being characterized by an $R_{MFI}$ value of between 1.1 and 6.

The expression "thermoplastic halogenated polymer compositions" is understood to mean, for the purposes of the present invention, compositions of one or more thermoplastic halogenated polymers. Preferably, the compositions according to the invention comprise a single thermoplastic halogenated polymer.

The teem "$R_{MFI}$" is understood to mean, for the purposes of the present invention, the ratio of two MFIs measured at the same temperature as explained below, namely the ratio of the $MFI_{8/2}$ obtained with a cylindrical die (height: 8±0.025 mm; diameter: 2.095±0.003 mm) to the $MFI_{0.3/1}$ obtained with a conical die. The conical die is characterized by a cone angle of 60°±0.5°, an outside diameter of 9.48 mm, an inside diameter of 1.0±0.025 mm, a total height of 2.55±0.025 mm and a height of the cylindrical section of 0.3±0.025 mm.

The two MFIs are obtained by measuring, according to the ASTM D1238 standard, the amount of polymer flowing through a calibrated die, the characteristics of which were given above, under a weight of 10 kg and at the same temperature. The measurement temperature is in general at least 20° C. above the melting point of the thermoplastic halogenated polymer when the composition comprises one thermoplastic halogenated polymer and it is at least 20° C. above the melting point of the thermoplastic halogenated polymer with the highest melting point when the composition comprises several thermoplastic halogenated polymers. The MFIs are expressed in g/10 min.

The $R_{MFI}$ value is an indication of the degree of branching in the compositions according to the invention. An $R_{MFI}$ value of between 1.1 and 6.0 generally corresponds to a low, but non-zero degree of branching.

The compositions according to the invention are usually characterized by an $R_{MFI}$ value of greater than 1.1, preferably greater than or equal to 1.2 and particularly preferably greater than or equal to 1.3.

The compositions according to the invention are usually characterized by an $R_{MFI}$ value of less than 6, preferably less than or equal to 5.5 and particularly preferably less than or equal to 5.

The compositions according to the invention are also usually characterized by a content of insoluble polymer fractions (IF) of less than or equal to 20% by weight, preferably less than or equal to 15% by weight, particularly preferably less than or equal to 10% by weight and most particularly preferably less than or equal to 5% by weight The expression "content of insoluble polymer fractions (IF)" is understood to mean, for the purposes of the present invention, the content of polymers insoluble in dimethylformamide (DMF). The insoluble matter is isolated by centrifuging after the specimen has been dissolved by reflux in DMF.

In the method used, 1 g of polymer is heated to reflux (with stirring) for 30 min. in 20 ml of DMF. The solution, cooled to room temperature, is then centrifuged at 27 000 rpm for 3 h. The supernatant fraction is then filtered in a filter crucible. The insoluble mater is washed with DMF at room temperature. It is then centrifuged a second time under the same conditions and the supernatant fraction is filtered in the sane filter crucible. After rinsing again with DMF, the insolubles from the centrifugation bucket and from the crucible were diffused into methanol so as to remove the residual DMF. After drying the insolubles to constant weight at 60° C. on a heater plate and then under vacuum (about 10 hPa), they are centrifuged a last time under the same conditions (27 000 rpm for 1 h). The minimum content that can be quantified by this technique is 1%.

The compositions according to the invention also advantageously exhibit extensional hardening behaviour in the melt characterized by an exponential increase in the extensional viscosity as a function of time.

The term "extensional viscosity" is understood to mean the extensional viscosity as determined by means of a rheometer, for an extension rate of 1 $s^{-1}$, on a specimen obtained by extrusion and subjected to internal stress relaxation before the measurements. The measurement temperature is in general at least 20° C. above the melting point of the thermoplastic halogenated polymer when the composition comprises one thermoplastic halogenated polymer and it is at least 20° C. above the melting point of the thermoplastic halogenated polymer whose melting point is the highest when the composition comprises several thermoplastic halogenated polymers.

The compositions according to the invention are also usually characterized in that the point of inflection corresponding to the exponential increase in the extensional viscosity as a function of time is in general less than 3 seconds, preferably less than 2 seconds.

The thermoplastic halogenated polymer compositions are also generally characterize by a quasi-linear relationship (absence of a Newtonian plateau) between the dynamic viscosity and the frequency when these parameters are plotted on a logarithmic plot.

The dynamic viscosity is usually measured between 0.1 and 100 rad/s by means of a rheogoniometer with an imposed deformation on a specimen 25 mm in diameter and 2 mm in thickness cut from a compression-moulded plaque, the said specimen being placed between two parallel plates and subjected to a periodic deformation. The measurement temperature is in general at least 20° C. above the melting point of the thermoplastic halogenated polymer when the composition comprises one thermoplastic halogenated polymer and it is at least 20° C. above the melt point of the thermoplastic halogenated polymer whose melting point is the highest when the composition comprises several thermoplastic halogenated polymers.

The term "thermoplastic polymers" is understood to mean, for the purposes of the present invention, polymers existing, at room temperature, below their glass transition temperature, if they are amorphous, or between their glass transition temperature and their melting point if they are crystalline. These polymers have the property of becoming soft when they are heated and of becoming rigid again when hey are cooled, without there being an appreciable chemical change. Such a definition may be found, for example, in the encyclopaedia called "*Polymer Science Dictionary*", Second Edition, Mark Alger, School of Polymer Technology, University of North London, London, UK, published by Chapman & Hall, 1997.

The term "halogenated polymers" is understood to mean, for the purposes of the preset invention, homopolymers of halogenated monomers and also copolymers and terpolymers thereof. Among these, mention may be made in particular of homopolymers of halogenated monomers such as vinylidene fluoride, vinyl fluoride, trifluoroethylene, chlorotrifluoroethylene, vinyl chloride and vinylidene chloride; copolymers and terpolymers that these halogenated monomers form amongst themselves; copolymers and terpolymers of at least one of these halogenated monomers with at least one fluorinated monomer not containing a hydrogen atom, such as tetrafluoroethylene and hexafluoropropylene; copolymers and terpolymers of at least one of these halogenated monomers with at least one other ethylenically unsaturated monomer, such as olefins, for example such as ethylene and propylene; styrene and styrene derivatives; vinyl ethers; vinyl esters, such as for example vinyl acetate; acrylic esters, nitriles and amides and methacrylic esters, nitriles and amides.

The thermoplastic halogenated polymers of the compositions according to the invention are preferably thermoplastic fluoropolymers.

The term "fluoropolymers" is understood to mean, for the purposes of the present invention, homopolymers of fluorinated monomers as well as copolymers and terpolymers thereof. Among these, mention may particularly be made of vinylidene fluoride, vinyl fluoride, trifluoroethylene and chlorotrifluoroethylene homopolymers and copolymers and terpolymers that the above fluorinated monomers form among themselves or it at least one other fluorinated monomer not containing a hydrogen atom, such as tetrafluoroethylene and hexafluoropropylene, such as for example copolymers and terpolymers of vinylidene fluoride with at least one other fluorinated monomer (including those not containing a hydrogen atom) as defined above, and copolymers and terpolymers of chlorotrifluoroethylene with at least one other fluorinated monomer (including those not containing a hydrogen atom) as defined above. Mention may also be made of copolymers and terpolymers of at least one of the abovementioned fluorinated monomers with at least one other ethylenically unsaturated monomer such as olefins, such as ethylene and propylene for example; styrene and styrene derivatives; chlorinated monomers such as, for example, vinyl chloride and vinylidene chloride; vinyl ethers; vinyl esters, such as vinyl acetate for example; acrylic esters, nitriles and amides and methacrylic esters, nitriles and amides.

The thermoplastic halogenated polymers of the compositions according to the invention are chosen particularly preferably from vinylidene fluoride thermoplastic polymers and chlorotrifluoroethylene thermoplastic polymers.

The term "vinylidene fluoride polymers" is understood to mean, for the purposes of the present invention, vinylidene fluoride homopolymers as well as its copolymers and terpolymers with other ethylenically unsaturated monomers, whether they be fluorinated (vinyl fluoride, trifluoroethylene, tetrafluoroethylene, chlorotrifluoroethylene, hexafluoropropylene) or non-fluorinated (olefins such as, for example, ethylene and propylene; styrene and styrene derivatives; chlorinated monomers, such as vinyl chloride and vinylidene chloride for example; vinyl others; vinyl esters, such as vinyl acetate for example; acrylic esters, nitriles and amides; methacrylic esters, nitriles and amides). The copolymers and terpolymers preferably contain at least about 50% by weight of monomeric units derived from vinylidene fluoride.

The term "chlorotrifluoroethylene polymers" is understood to mean, for the purposes of the present invention, chlorotrifluoroethylene homopolymers as well as its copolymers and terpolymers with other ethylenically unsaturated monomers, whether they be fluorinated (vinylidene fluoride, vinyl fluoride, trifluoroethylene, tetrafluoroethylene, hexafluoropropylene) or non-fluorinated (olefins such as ethylene and propylene for example; styrene and styrene derivatives; chlorinated monomers such as vinyl chloride and vinylidene chloride for example; vinyl ethers; vinyl esters, such as vinyl acetate for example; acrylic esters, nitrites and amides; methacrylic esters, nitrites and amides). The copolymers preferably contain at least about 50% by weight of monomeric units derived from chlorotrifluoroethylene.

The thermoplastic halogenated polymers of the compositions according to the invention are most particularly preferably vinylidene fluoride thermoplastic polymers.

The thermoplastic halogenated polymers of the compositions according to the invention are advantageously chosen from vinylidene fluoride homopolymers and copolymers and terpolymers of vinylidene fluoride with at least one other fluorinated monomer.

The compositions according to the invention may furthermore include one or more standard additives for thermoplastic halogenated polymers, particularly fluorinated polymers, such as for example acid scavengers, lubricants, organic dyes or mineral pigments, nucleating agents, filler materials, stabilizers and fire retardants.

The compositions according to the invention may be obtained by any process. Good results are obtained if they are prepared by means of the process according to the invention.

The invention also relates to a process for preparing thermoplastic halogenated polymer compositions, in which one or more thermoplastic halogenated polymers are made to react in the melt, in an extruder, with a radical initiator and a coupling agent and the compositions obtained are discharged by the extruder.

The thermoplastic halogenated polymers are defined above and are preferably thermoplastic fluoropolymers.

Preferably, in the process according to the invention, a thermoplastic halogenated polymer is made to react in the melt, in an extruder, with a radical initiator, and a coupling agent.

In the rest of the text, the expressions "thermoplastic halogenated polymers" and "thermoplastic fluoropolymers"

are understood, for the purposes of the present invention, both in the plural and the singular.

The radical initiator is in general employed in the process according to the invention in an amount sufficient to allow the reaction between the coupling agent and the thermoplastic halogenated polymers. The amount of radical initiator is from 0.5 to 10 g/kg of thermoplastic halogenated polymers.

The amount of radical initiator is at least 0.5, preferably at least 0.75 and particularly preferably at least 1 g/kg of thermoplastic halogenated polymers.

The amount of radical initiator is at most 10, preferably at most 9 and particularly preferably at most 8 g/kg of thermoplastic halogenated polymers.

As radical initiator, it is preferable to use an organic peroxide, and in particular an alkyl peroxide. Among these, mention may be me of t-butyl cumyl peroxide, 1,3-di(2-t-butylperoxyisopropyl)benzene, 2,5-dimethyl-2,5-di(t-butylperoxy)hexane, di(t-butyl) peroxide and 2,5-dimethyl-2,5-di(t-butylperoxy)-3-hexyne. It is particularly preferable to use 2,5-dimethyl-2,5-di(t-butylperoxy)hexane.

The coupling agent is in general employed in the process according to the invention in an amount sufficient to allow branching of the thermoplastic halogenated polymers. The amount of coupling agent is from 0.5 to 50 g/kg of thermoplastic halogenated polymers.

The amount of coupling agent is at least 0.5, preferably at least 2 and particularly preferably at least 2.5 g/kg of thermoplastic halogenated polymers.

The amount of coupling agent is at most 50, preferably at most 40 and particularly preferably at most 30 g/kg of thermoplastic halogenated polymers.

In the process according to the invention, the coupling agent is generally chosen from functional compounds having at least two fictional groups chosen from vinyl unsaturated groups, allyl unsaturated groups and carboxylic, amine, hydroxyl, silane or epoxide fictional groups. The coupling agent is preferably chosen from the group formed by triallyl isocyanurate, divinylbenzene, vinyltrimethoxysilane and allyltriethoxysilane. Triallyl isocyanurate is particularly preferred.

The radical initiator and the coupling agent may be introduced in any manner whatsoever, provided that they are introduced continuously over time and are well dispersed in the melt. The radical initiator and coupling agent may be introduced by spraying, for example by means of a spray-type injector or a vaporizer, or by injection into the melt Introducing the radical initiator and the coupling agent via a masterbatch with the powdered thermoplastic halogenated polymers or via a masterbatch with a filler may also be envisaged.

According to a preferred embodiment of the invention, the radical initiator and the coupling agent are introduced into the extruder as a mixture with carbon dioxide. Any device for mixing the radical initiator or the coupling agent with carbon dioxide and allowing this mixture to be introduced into the extruder may be used for this purpose.

According to a particularly preferred embodiment, the coupling agent is introduced before the radical initiator.

The term "melt reaction" is understood to mean, for the purposes of the present invention, any reaction substantially with no solvent or diluent and at a temperature at least equal to the melting point of the thermoplastic halogenated polymers.

The term "extruder" is understood to mean any continuous device having at least one feed zone and, at its exit, a discharge zone preceded by a compression zone, the later forcing the melt to pass through the discharge zone. The discharge zone may furthermore be followed by a granulator or a device giving the extruded material its final form. Advantageously, known extruders based on working with two screws, whether these are corotating or counterrotating or Buss-type extruders will be used.

Preferably, the extruder used in the process according to the present invention is designed so that it comprises, in succession, a feed zone, a material-melting zone, a homogenization zone, a reaction zone, optionally an additive introduction zone, and a compression-discharge zone preceded by a venting zone. Each of these zones has a very specific fiction and is at a very specific temperature.

The function of the feed zone is to feed the thermoplastic halogenated polymer. This zone is usually at a temperature not exceeding 50° C.

The function of the material melting zone is to melt the material.

The function of the homogenization zone is to homogenize the melt

The function of the reaction zone is to achieve the reaction.

The temperature in the material melting zone and the material homogenization zone is usually greater than or equal to the melting point of the thermoplastic halogenated polymers.

The temperature in the reaction zone is usually greater than or equal to the temperature at which the halflife of the radical initiator is shorter than the residence time of the material in this zone.

The function of the additive introduction zone is to introduce additives when these are added to the extruder. The temperature of this zone generally depends on the viscosity of the material and the nature of the additives that are added.

The function of the compression-discharge zone is to compress the material and discharge it. The temperature in the compression-discharge zone generally depends on the viscosity of the material to be discharged.

The coupling agent is preferably introduced into the extruder upstream of the homogenization zone.

The radical initiator is preferably introduced into the reaction zone of the extruder.

During the process, it is possible to incorporate one or more standard additives for thermoplastic halogenated polymers, particularly thermoplastic fluoropolymers, such as for example acid scavengers, lubricants, organic dyes or mineral pigments, nucleating agents, filler materials, stabilizes and fire retardants. This or these additives may be introduced into the extruder or else into the compositions once they have been discharged from the extruder.

The present invention also relates to the use of the compositions according to the invention for the manufacture of films, sheets, panels, foamed tubing, tubes, pipes, foams, bottles or products that are thermoformed and/or moulded.

The invention also relates to the films obtained from the compositions according to the invention.

The invention also relates to the sheets obtained from the compositions according to the invention.

The invention also relates to the panels obtain from the compositions according to the invention.

The invention also relates to the foamed tubing obtained from the compositions according to the invention.

The invention also relates to the tubes or pipes obtained from the compositions according to the invention.

The invention also relates to the foams obtained from the compositions according to the invention.

The invention also relates to the bottles obtained from the compositions according to the invention.

The invention also relates to the products that are thermoformed and/or moulded obtained from the compositions according to the invention.

The invention also relates to the use of foamed tubing obtained from the compositions according to the invention for the sheathing of power cables.

The thermoplastic halogenated polymer, particularly thermoplastic fluoropolymer, compositions according to the invention are therefore advantageously characterized by a rheological behaviour (extensional viscosity) such that thy are characterized by an increase in the resistance to deformation during foaming, hence a foaming process that is extremely stable and giving rise to the formation of foamed tubing characterized by a homogeneous distribution of uniform closed cells, a narrow cell size distribution and by the formation of a continuous skin without any surface defect caused by the presence of open cells.

The compositions according to the invention are furthermore characterized by a low content of insoluble polymer fractions, giving rise to products having very few or no heterogeneous regions.

The examples that follow serve to illustrate the present invention without thereby limiting the scope thereof.

Thermoplastic Halogenated Polymer

The thermoplastic halogenated polymer used was the vinylidene fluoride/chlorotrifluoroethylene copolymer sold by Solvay under the name SOLEF® 31508.

Radical Initiator

The radical initiator used was 2,5-dimethyl-2,5-di-t-butylperoxyhexane (DHBP) sold under the brand name LUPERSOL® 101 by Peroxid Chemie.

Coupling Agent

The coupling agent used was triallyl isocyanurate (TAIC) stabilized by 100 ppm of 2,6-di-t-butyl-4-methylphenol sold by Acros.

Extruder for Producing the Compositions

The extruder used for producing the compositions was a CLEXTRAL (model BC 21) corotating twin-screw extruder. The diameter of the screws was 25 mm. The 900 mm (L/D=36) jacketed barrel consisted of nine independent zones, together with a convergence section and a die.

The temperature profile employed was the following:

| | |
|---|---|
| Feed zone: | 50° C. |
| Zone 2: | 150° C. |
| Zone 3: | 190° C. (melting zone) |
| Zone 4: | 190° C. (homogenization zone) |
| Zones 5 and 6: | 190° C. (reaction zone) |
| Zone 7: | 190° C. (venting zone) |
| Zones 8 and 9: | 200° C. (compression-discharge zones) |
| Convergence section: | 210° C. |
| Die: | 210° C. |

The coupling agent was introduced into zone 3 and the radical initiator into zone 5.

Device for Introducing the Radical Initiator and the Coupling Agent

The device used for introducing the radical initiator as a mixture with carbon dioxide and for introducing the coupling agent as a mixture with carbon dioxide is described in more detail below.

The DHBP contained in a reservoir was fed into a mixing chamber by means of a pump. The liquid carbon dioxide contained in a cylinder was cooled to −10° C. in a cryothermostat before being fed into a mixing chamber by means of a pump. The DHBP/liquid carbon dioxide mixture produced in the mixing chamber was the discharged into the injector, the pressure of which was measured by means of a pressure sensor.

The liquid carbon dioxide reservoir was a pressurized cylinder of carbon dioxide.

The two pumps were pumps of the GILSON 806 type. The head of the pump provided for the carbon dioxide was equipped with a 10SC head and a GILSON 10SC kit thermostat to allow the head to be cooled to −10° C. The coolant was isopropanol cooled in a JULABO F30-type cryothermostat.

This same cryothermostat was used to cool the liquid carbon dioxide.

The mixing chamber was an analytical mixer of the GILSON 811C type fitted with a propeller stirrer.

The injector was an injector allowing operation at high pressure (above 74 bar).

A pressure sensor of the GILSON 806 type was placed between the pump provided for the carbon dioxide and the mixing chamber so as to measure the pressure in the injector (between 90 and 120 bar).

The same arrangement was used for the coupling agent.

The head of the TAIC pump and the pipes were heated to 35° C. in order to prevent the reactant from crystallizing. The apparatus used was a JULABO FP50 containing ethylene glycol. The carbon dioxide was mixed with the TAIC using a static mixer of the ASI STATIC MIXER type suitable for low throughputs.

The injector of the introduction device was placed perpendicular to the barrel of the extruder and emerged tangentially to the extrusion screw flights.

Characterization of the Compositions Obtained

The compositions obtained were characterized by:
- MFI measurements for determining the $R_{MFI}$;
- extensional rheology (RME) measurements for determining the extensional viscosity;
- dynamic rheology measurements (RES) for determining the viscoelastic properties (dynamic viscosity and tan δ) as a function of frequency; and
- measurements of the content of insoluble polymer fractions (IF).

Determination of the $R_{MFI}$

The $R_{MFI}$ was determined by calculating the ratio of the two MFIs measured at the same temperature as explained below, namely the ratio of the $MFI_{8/2}$ obtained with a cylindrical die (height: 8±0.025 mm; diameter: 2.095±0.003 mm) to the $MFI_{0.3/1}$ obtained with a conical die. The conical die was characterized by a cone angle of 60°±0.5°, an outside diameter of 9.48 mm, an inside diameter of 1.0±0.025 mm, a total height of 2.55±0.025 mm and a height of the cylindrical section of 0.3±0.025 mm.

The two MFIs were obtained by measuring, according to the ASTM D1238 standard, the amount of polymer passing through each calibrated die described above and expressed in g/10 min.

The apparatus used for measuring the MFIs was a CEAST Melt Indexer of the 6542/000 type. It consisted mainly, on the one hand, of a steel cylinder carrying, in its lower part, a calibrated die and, on the other hand, of a piston onto which various masses can be fitted.

The measurements were carried out on the SOLEF® 31508 PVDF resin at 230° C. and the mass used for the "piston/mass" combination was 10 kg.

Extensional Rheology (RME) Measurement

The extensional rheometry measurements were carried out by means of a rheometer sold by Rheometrics under the name RME. This analysis made it possible to quantify the extensional hardening of the polymer in the melt by studying its behaviour when it was subjected to an extensional movement in the melt. To do this, the resin was firstly extruded in the form of a test specimen. The deformation of the specimen was recorded at a fixed temperature (230° C.) and at a fixed deformation rate (1 s$^{-1}$).

The result of the measurement (RME plot) was expressed by the variation of the extensional viscosity (expressed in kPa.s) in the melt at 230° C. as a function of time (expressed in s) for an extension rate (expressed in s$^{-t}$) of 1.

Dynamic Rheology (RDS) Measurement

The dynamic rheometry measurements were carried out by means of an imposed-deformation rheogoniometer sold by Rheometrics under the name ARES (Advanced Rheological Expansion System). This technique made it possible to determine the shear viscoelastic properties of the polymer in the melt.

The viscoelastic properties (elastic modulus G', loss modulus G", tan δ (G"/G' ratio) and the dynamic vicosity η) were measured in plate-plate geometry on disks 25 mm in diameter and about 2 mm in thickness taken from compression-moulded plaques. A periodic shear was applied by the movement of the lower plate, while the upper plate was equipped with torque or normal force transducers. The specimens were analyzed at a fixed temperature (230° C.) and at a frequency ranging between 0.1 and 100 rad/s.

The result of the measurement was expressed by the variation, at 230° C., of the dynamic viscosity, expressed in Pa.s, or of the moduli G' and G", expressed in Pa, as a function of the frequency expressed in rad/s.

Measurement of the Content of Insoluble Polymer Fractions (IF)

The method consisted in determining the content of polymer fractions insoluble in dimethylformamide (DMF). The insoluble matter was isolated by centrifuging, after the specimen had been dissolved by reflux in DMF. The operating method was described above. The determination limit of the method was 1% by weight Extruder for Producing Foamed Tubing Foamed tubing was produced by means of an extruder of the Nokia-Maillefer Sel 30 type—a single-screw e d of diameter D=30 mm and length L=25D, the die being such that a hollow sheath was obtained.

The screw profile consisted of transporting elements and it was such that a compression ratio of 3 was obtained (15D-3D-7D), The temperature profile employed was the following:

| | |
|---|---|
| feed zone: | 10° C. |
| zone 1: | 185° C. |
| zone 2: | 195° C. |
| zone 3: | 205° C. |
| zone 4: | 215° C. |
| convergence section: | 220° C. |
| die: | 220° C. |

The screw rotation speed was 77 rpm. The haul-off rate of the tubing was 12 metres/minute.

Blowing Agent

The blowing agent used was an endothermic blowing agent releasing carbon dioxide between 135 and 284° C.

Characterization of the Foamed Tubing

The foamed tubing obtained was characterized by:
its density;
its mechanical properties;
its dielectric properties;
microscopy of microtome sections.

Measurement of the of Foamed Tubing

The density of the foamed tubing was measured using the buoyancy method. After having been weighed in air, the specimen of foamed tubing was placed in a pod and immersed in water of known temperature. The mass of the pod+specimen combination gave the upthrust of the liquid, thereby allowing the density of the material to be obtained from Archimedes' equation (after having subtracted the mass of the pod).

The weighing in water was carried out immediately after immersion. Finally, before the weighing in water, any air bubbles attached to the inner and outer surfaces were removed.

Mechanical Properties of the Foamed Tubing

The elongation at break and the tensile strength of the foamed tubing were determined, at room temperature (23° C.) and at 50% relative humidity, according to the ASTM D1238 standard. The pull rate was 50 mm/min and the distance between the jaws was 50 mm. The extensometer was set at 25 mm. The apparatus was an Instron 4301. It was equipped with G29 flat jaws and with an EL1 Long Travel extensometer. The load cell was thus referenced 1kN fl/995.

Dielectric Properties of the Foamed Tubing

The foamed tubing was covered with an adhesive copper foil on the outer surface. This acted as the outer electrode. The electrode introduced inside the foamed tubing was a metal core.

The measurement bridge used was a Wayne Kerr Precision Compound Analysis 6425 bridge. It measured the capacitance and the loss tangent (tan δ) at the desired frequency. The dielectric constant (ε) was calculated from these two values and from the dimensions of the foamed tubing. The measurements were carried out at room temperature (27° C.).

Microscopy of Microtome Sections of the Foamed Tubing

The foamed tubing specie were placed on a metal support cooled to −20° C. Next, drops of water were deposited and froze around the tubing. This made it possible to obtain specimens rigid enough to be cut (in the longitudinal direction and in the transverse direction) into narrow strips 35 μm in thickness.

The images of these strips were magnified up to 50 times using a Wild Makroscop M420 microscope coupled to a Toshiba 3 CCD camera and to a Hewlett Packard 890C Deskjet printer. This allowed a photograph to be obtained with the abovementioned magnifications.

EXAMPLES 1 TO 2 (COMPARATIVE) AND EXAMPLES 3 TO 4 (ACCORDING TO THE INVENTION)

The SOLEF® 31508 halogenated polymer was introduced into the feed zone of the extruder described above (the extruder for producing the compositions) at a rate of 8 kg/h and travelled through the various zones of the extruder.

The DHBP mixed with carbon dioxide and the TAIC mixed with carbon dioxide were sprayed onto the halogenated polymer by means of the introduction device described above. The TAIC and DHBP doses, expressed in g/kg of the SOLEF® 31508 halogenated polymer, introduced into the extruder in zone 3 and zone 5 respectively, for each of Examples 1 to 4 are given in Table 1.

TABLE 1

TAIC and DHBP doses

|  | TAIC | DHBP |
|---|---|---|
| Example 1 (comparative) | 0 | 0 |
| Example 2 (comparative) | 0 | 3 |
| Example 3 | 4 | 3 |
| Example 4 | 5 | 2.5 |

The $R_{MFI}$ and the content of insoluble polymer fractions (IF) values as well as the tan δ values at 0.1 rad/s measured on the compositions obtained are given in Table 2.

TABLE 2

|  | $R_{MFI}$ | FI | tan δ at 0.1 rad/s |
|---|---|---|---|
| Example 1 (comparative) | 1 | 0 | 3.27 |
| Example 2 (comparative) | 1 | 0 | 2.61 |
| Example 3 | 4 | 3.3 | 0.73 |
| Example 4 | 4.7 | 4 | not determined |

The variation of the extensional viscosity (expressed in kPa.s) at 230° C. as a function of time (expressed in s) for an extension rate (expressed in $s^{-1}$) of 1 is illustrated in FIG. 1 for the compositions according to Example 1 (○ symbol), according to Example 2 (◇ symbol), according to Example 3 (□ symbol) and according to Example 4 (+ symbol).

The variation of the dynamic viscosity (expressed in kPa.s) at 230° C. as a function of time (expressed in s) for an extension rate (expressed in $s^{-1}$) of 1 is illustrated in FIG. 2 for the compositions according to Example 1 (○ symbol), according to Example 2 (◇ symbol) and according to Example 3 (□ symbol).

EXAMPLES 5 TO 6 (COMPARATIVE)

The compositions according to Examples 1 and 2 were then processed by foaming extrusion. To do this, the foaming agent described above was incorporated into the compositions according to Examples 1 and 2, in an amount of 1.5% by weight, before they were passed into the extruder described above (the extruder for producing the foamed tubing).

It was not possible to obtain foamed tubing by foaming extrusion of the compositions according to Examples 1 and 2.

EXAMPLES 7 AND 8 (ACCORDING TO THE INVENTION)

The compositions according to Examples 3 and 4 were then processed by foaming extrusion. To do this, the foaming agent described above was incorporated into the compositions according to Examples 3 and 4, in an amount of 1.5% by weight, before they were passed into the extruder described above (the extruder for producing foamed tubing).

High-quality, flexible foamed tubing, hollow at its centre, with an inside diameter of 3 mm and a thickness of 0.5 mm, was thus obtained. The foaming process was stable.

The values of the density, the elongation at break, the tensile strength, the dielectric constant (ε) and the loss tangent (tan δ) at 100 kHz, measured on the foamed tubing obtained from the compositions according to Example 3 (Example 7) and according to Example 4 (Example 8), respectively, are given in Table 3.

Microscopical observation of the microtome sections of the foamed tubing demonstrated that very high quality foamed tubing was obtained, characterized by: the presence of small regular closed cells, the size distribution being uniform; the presence of only a few large cells; and the absence of any surface defect.

TABLE 3

|  | Density ($g/cm^3$) | Elongation at break (%) | Tensile strength (MPa) | Dielectric constant at 100 kHz | tan δ at 100 kHz |
|---|---|---|---|---|---|
| Example 7 | 1.06 | 254 | 9.6 | 4 | 0.05 |
| Example 8 | 1.00 | 360 | 11.1 | 3.1 | 0.046 |

Analysis of Table 2 shows that the compositions according to the invention are characterized by a higher $R_{MFI}$ value than those measured for the compositions according to the prior art and by a very low content of insoluble polymer fractions.

The compositions according to the invention are also characterized by a lower tan δ value than those measured for the compositions according to the prior art.

BRIEF DESCRIPTION OF THE DRAWINGS

Examination of FIG. 1 shows that the compositions according to the invention are also characterized by an exponential increase in the extensional viscosity as a function of time, characterized by a structural hardening under stain, unlike the compositions according to the prior art.

In addition, the point of inflection corresponding to the exponential increase in the extensional viscosity as a function of time is less than 3 seconds, unlike the compositions according to the prior art.

Figure 1:
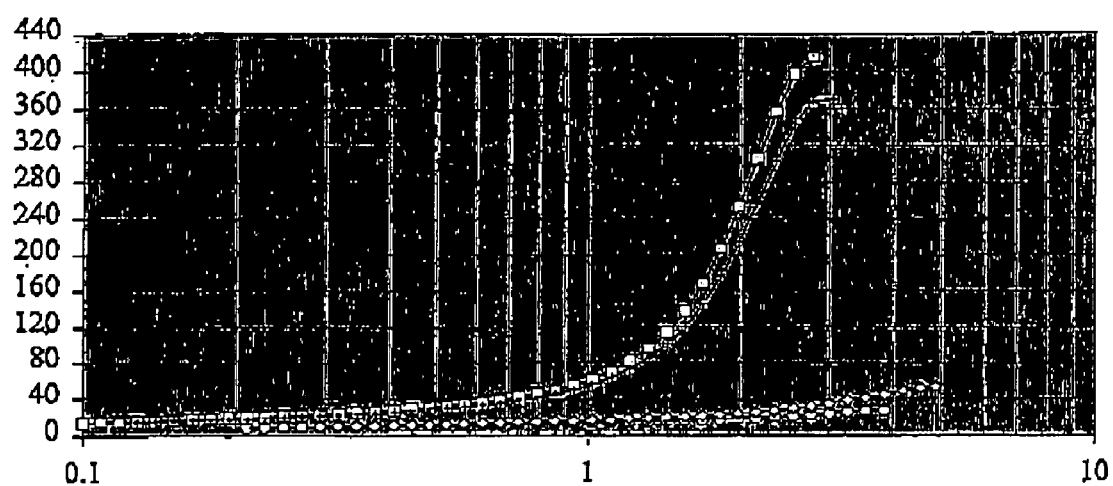
Figure 2:
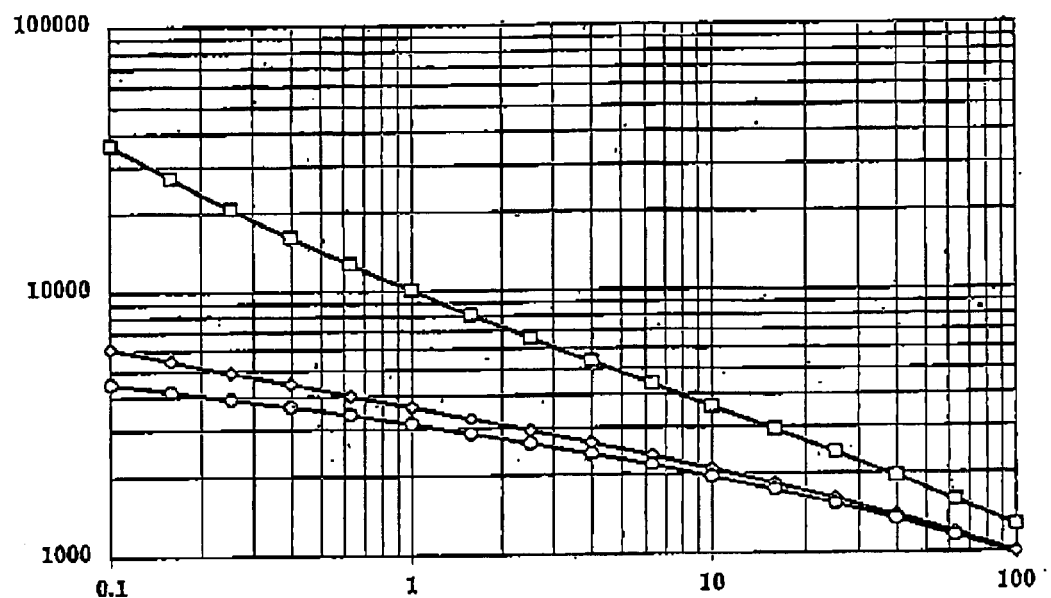

Examination of FIG. 2 (logarithmic plot) shows that the compositions according to the invention are characterized by a quasi-linear relationship between the dynamic viscosity and the frequency. In contrast, the compositions according to the prior art are characterized by a variation in the dynamic viscosity towards decreasing frequencies in the form of a Newtonian plateau.

Examining the foam tubing results shows that the compositions according to the invention make it possible to obtain very high quality foamed tubing of suitable density, having a high tensile strength and exhibiting very good dielectric properties. In contrast, the compositions according to the prior art do not allow foamed tubing to be obtained.

What is claimed is:

1. A polymer composition comprising one or more thermoplastic halogenated polymers, said composition having an $R_{MFI}$ value of between 1.1 and 6, said $R_{MFI}$ value being a ratio of $MFI_{8/2}$ to $MFI_{0.3/1}$ measured according to ASTM D1238.

2. A polymer composition according to claim 1, having a content of insoluble polymer fractions (IF) of less than or equal to 20% by weight.

3. A polymer composition according to claim 1, having extensional hardening behavior in the melt so that the extensional viscosity of the polymer composition exponentially increases as a function of time.

4. A polymer composition according to claim 1, wherein the thermoplastic halogenated polymers are thermoplastic fluoropolymers.

5. A polymer composition according to claim 1, wherein said composition comprises a vinylidene fluoride thermoplastic polymer.

6. A polymer composition according to claim 1, wherein said composition comprises a chlorotrifluoroethylene thermoplastic polymer.

7. A polymer composition according to claim 1, wherein said composition comprises a vinylidene fluoride/chlorotrifluoroethylene thermoplastic copolymer.

8. A process for preparing thermoplastic halogenated polymer compositions having an $R_{MFI}$ value of between 1.1 and 6, said $R_{MFI}$ value being a ratio of $MFI_{8/2}$ to $MFI_{0.3/1}$ measured according to ASTM D1238, which comprises:
   reacting one or more thermoplastic halogenated polymers, in a melt in an extruder, with a radical initiator and a coupling agent; and
   subsequently discharging the compositions obtained thereby from the extruder.

9. The process according to claim 8, wherein the amount of radical initiator is from 0.5 to 10 g/kg of thermoplastic halogenated polymers.

10. The process according to claim 8, wherein the amount of coupling agents is from 0.5 to 50 g/kg of the thermoplastic halogenated polymers.

11. The process according to claim 8, wherein the coupling agent is selected from the group consisting of triallyl isocyanurate, divinylbenzene, vinyltrimethoxysilane, and allyltriethoxysilane.

12. The process according to claim 8, wherein the coupling agent is introduced into the melt before the radical initiator.

13. A process according to claim 8, comprising reacting a vinylidene fluoride thermoplastic polymer in a melt in an extruder with a radical initiator and a coupling agent.

14. A process according to claim 8, comprising reacting a chlorotrifluoroethylene thermoplastic polymer in a melt in an extruder with a radical initiator and a coupling agent.

15. A process according to claim 8, comprising reacting a vinylidene fluoride/chlorotrifluoroethylene thermoplastic polymer in a melt in an extruder with a radical initiator and a coupling agent.

16. A thermoformed and/or molded film, sheet, panel, foamed tubing, tube, pipe, foam, bottle or product, comprising:
   the polymer composition according to claim 1.

17. A sheathing for a power cable, comprising:
   the polymer composition according to claim 1.

18. A thermoformed and/or molded film, sheet, panel, foamed tubing, tube, pipe, foam, bottle or product, comprising:
   the polymer composition according to claim 5.

19. A thermoformed and/or molded film, sheet, panel, foamed tubing, tube, pipe, foam, bottle or product, comprising:
   the polymer composition according to claim 6.

20. A thermoformed and/or molded film, sheet, panel, foamed tubing, tube, pipe, foam, bottle or product, comprising:
   the polymer composition according to claim 7.

* * * * *

UNITED STATES PATENT AND TRADEMARK OFFICE
CERTIFICATE OF CORRECTION

PATENT NO. : 6,979,715 B2
DATED : December 27, 2005
INVENTOR(S) : Manfredi et al.

It is certified that error appears in the above-identified patent and that said Letters Patent is hereby corrected as shown below:

<u>Title page,</u>
Item [75], should read:
-- [75] Inventors: Dino Manfredi, Houthalen-Helchteren (BE); Fernand Gauthy, Wemmel (BE); Nestor Maquet, Marche (BE) --.

Signed and Sealed this

Eighteenth Day of April, 2006

JON W. DUDAS
*Director of the United States Patent and Trademark Office*